Dec. 4, 1956 — E. M. GREENLEE — 2,772,508
FISH LINE PULLAWAY SINKER
Filed April 28, 1954

INVENTOR
Eli M. Greenlee

United States Patent Office 2,772,508
Patented Dec. 4, 1956

2,772,508

FISH LINE PULLAWAY SINKER

Eli M. Greenlee, Newport, Ky.; Claude A. Greenlee, administrator of the estate of said Eli M. Greenlee, deceased Application April 28, 1954, Serial No. 426,258

1 Claim. (Cl. 43—43.15)

This invention relates to sinkers for fish lines.

It is an object of the present invention to provide sinkers for fish lines which may be adapted to any line, hook and bait of the user's choice and which eliminates the jerking and pulling and running backwards with reel and pole so common with all reel and pole fishermen when the fish strikes.

It is another object of the present invention to provide a sinker which literally causes the fish to hook themselves when they strike and run.

Other objects of the present invention are to provide a fish line pullaway sinker bearing the above objects in mind which is of simple construction, inexpensive to manufacture, has a minimum number of parts, is easy to use and efficient in operation.

For other objects and a better understanding of the invention, reference may be had to the following detailed description taken in connection with the accompanying drawing, in which.

Figures 1, 2, 3:
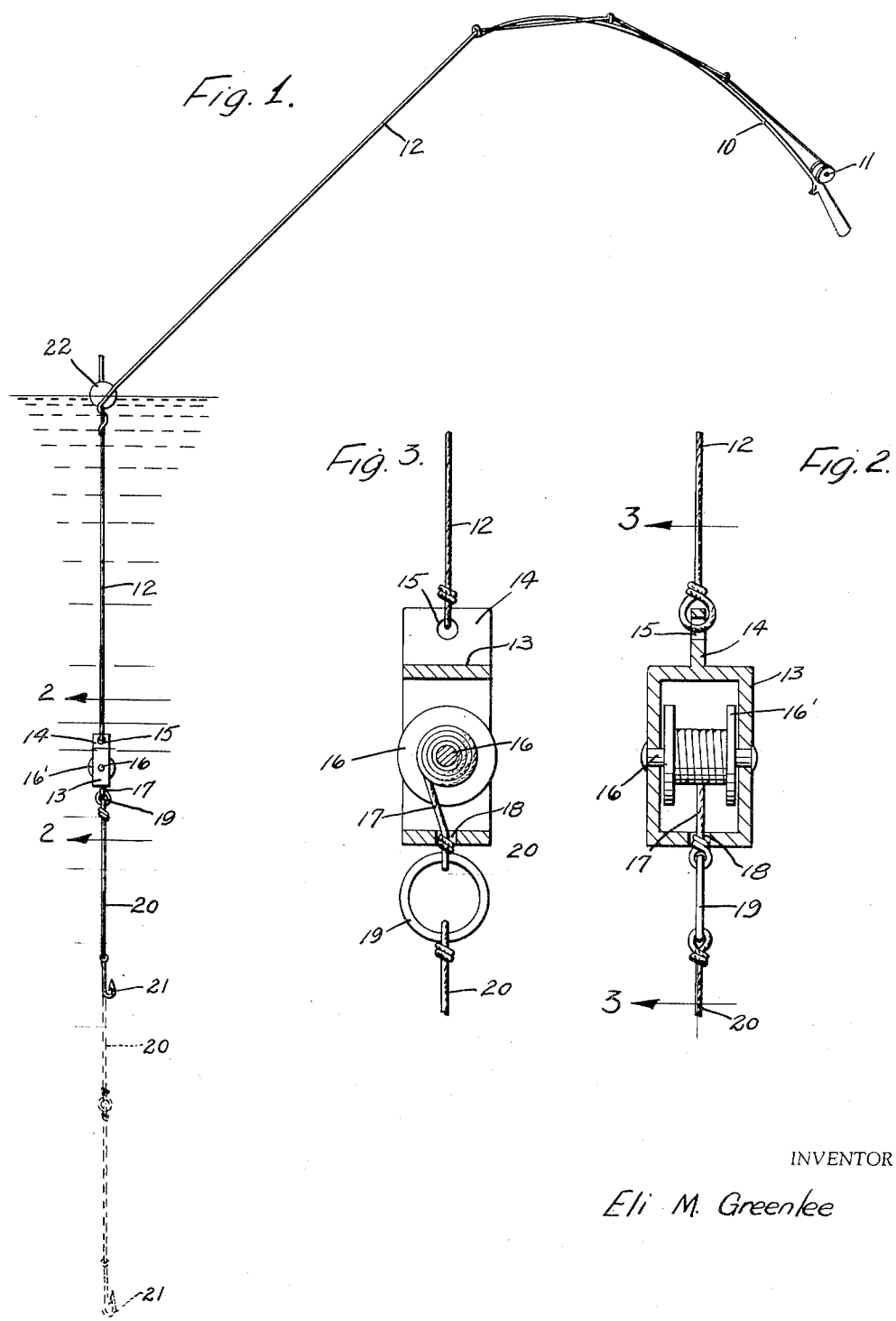
Figure 1 is a perspective view showing the device in operative use on a fishing reel and line.
Fig. 2 is a vertical sectional view taken along the line 2—2 of Fig. 3.
Fig. 3 is a vertical sectional view taken along the line 3—3 of Fig. 2.

Referring now more in detail to the drawing, 10 represents a conventional fishing pole having a reel 11 and a line 12, substantially as illustrated.

In the practice of my invention an improved sinker is provided and includes a rectangular frame 13 of lead, brass, aluminum or other suitable material integrally formed along its top wall with an upwardly extending lug 14 having an aperture 15 to which the end of the line 12 is secured. A transverse pin 16 connects the side walls of the frame 13, the ends thereof being peened so as to prevent their displacement through the openings in the frame. A spool 16' is rotatably mounted on the pin 16 within frame 13 and has wound thereon a line 17 which extends downwardly through an opening 18 provided in the bottom wall of the frame 13. A stop ring 19 is connected to the end of the line 17 and limits the upward displacement of the latter through the opening 18, a second line 20 being connected at one end to the stop ring 19 and at its other end to a fish hook 21.

A buoy 22 may be threaded on to the line 12 intermediate the rod 10 and frame 13 and serving to retain the line 12 intermediate the buoy 22 and frame 13 in a substantially vertical position (Fig. 1).

In operation, the line 17, which is about one foot in length, is wound tightly onto the drum 16' until the stop ring 19 abuts the bottom wall of the frame 13, whereupon the latter is pulled tight and then the line is cast in the usual manner. A fish striking the hook at any angle will carry the hook 21 with it and be permitted to run with the bait, the spool 16' unwinding the line 17 and when the latter reaches its full length the fish will be jerked back and in effect hook itself.

While various changes may be made in the detail construction, it shall be understood that such changes shall be within the spirit and scope of the present invention as defined by the appended claim.

Having thus set forth and disclosed the nature of my invention, what is claimed is:

The combination with a fishing rod having a reel and a line, of a sinker comprising an open frame having a top wall, a bottom wall, and a pair of side walls connecting said top and bottom walls, a spool rotatably mounted between said side walls, the ends of said spool at their periphery extending outwardly beyond the vertical edges of said side walls to facilitate rotation thereof, a second line wound on said spool, said bottom wall having an opening therethrough, said second line passing downwardly through said opening, a stop ring connected to the end of said second line below said bottom wall and adapted to abut the latter when the second line is wound tightly on said spool, a third line connected at one end to said stop ring and at the other to a fish hook, a vertical lug integrally formed in said top wall having an aperture, the end of the first line being secured within said aperture, and a buoy threaded onto said first line intermediate the fishing rod and said frame whereby to retain the first line intermediate said buoy and frame in a substantially vertical position.

References Cited in the file of this patent

UNITED STATES PATENTS

| | | |
|---|---|---|
| 187,021 | Levy | Feb. 6, 1877 |
| 384,853 | Keller | June 19, 1888 |
| 542,917 | Bardsley | July 16, 1895 |
| 1,024,417 | Pagnod | Apr. 23, 1912 |
| 1,103,955 | Garon | July 21, 1914 |
| 2,457,715 | Pazzano | Dec. 28, 1948 |
| 2,728,161 | Mangel et al. | Dec. 27, 1955 |